UNITED STATES PATENT OFFICE.

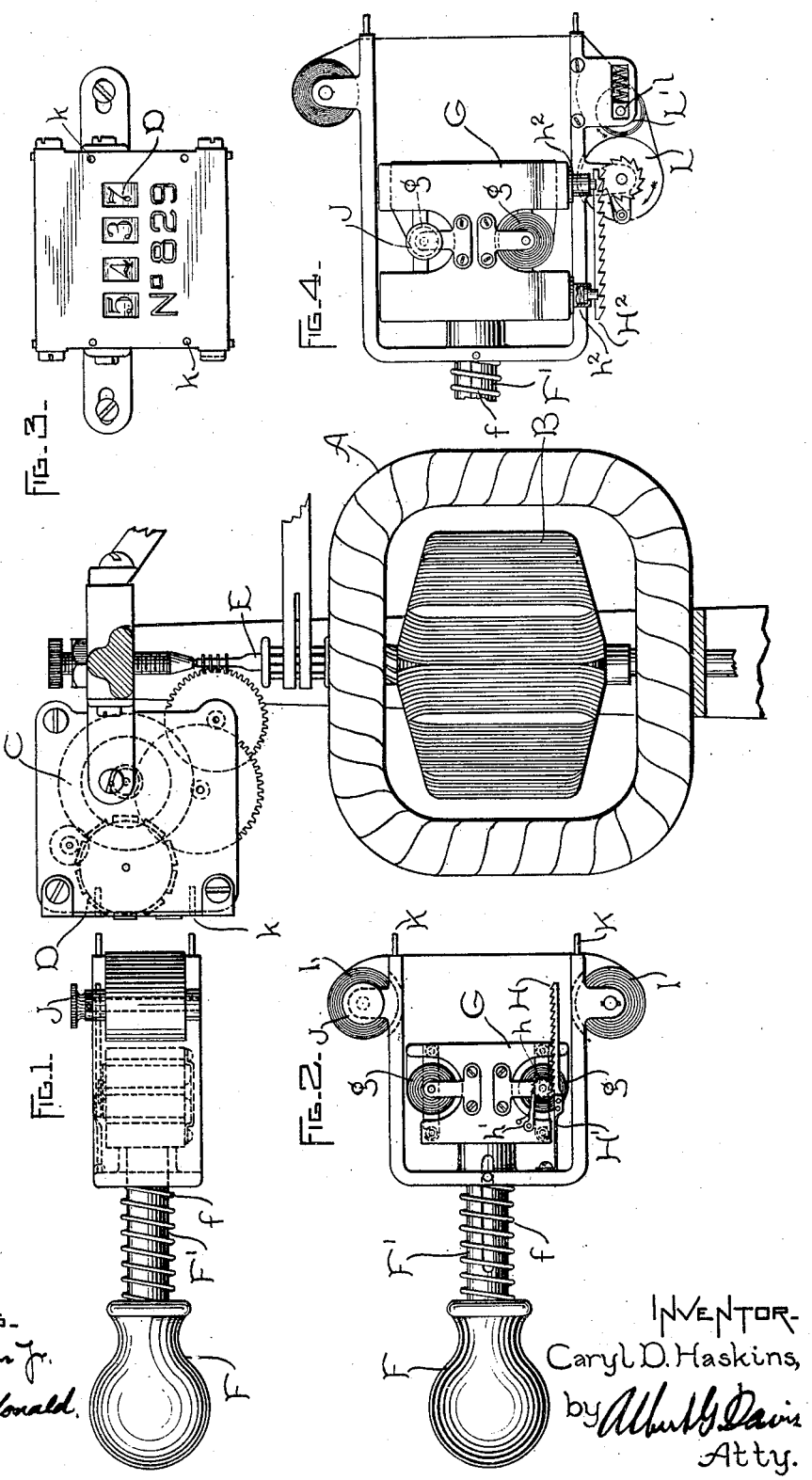

CARYL D. HASKINS, OF NEWTON, MASSACHUSETTS, ASSIGNOR TO THE GENERAL ELECTRIC COMPANY, OF NEW YORK.

DEVICE FOR RECORDING METER READINGS.

SPECIFICATION forming part of Letters Patent No. 678,871, dated July 23, 1901.

Application filed February 11, 1899. Serial No. 705,245. (No model.)

*To all whom it may concern:*

Be it known that I, CARYL D. HASKINS, a citizen of the United States, residing at Newton, county of Middlesex, State of Massachusetts, have invented certain new and useful Improvements in Devices for Recording Meter Readings, (Case No. 897,) of which the following is a specification.

Many of the errors in rendering bills for electric current or gas supplied by meter are due to inaccuracy in meter readings. In a great many cases low-priced labor is used for this purpose, and the consequent inaccuracies are a source of friction between the consumer and the station. To eliminate as far as possible such errors, I have devised my present invention, which consists of a contrivance for printing from the meter-dial itself a record which shall be indisputable and show exactly the reading at the time of taking the impression. Such devices have been heretofore proposed, but they have been open to some objections. One of them has consisted of hands upon the meter-dials, which turned up at the point, so that by pressing a printed form over the hands their positions were punctured on the form. This, however, was crude and unsatisfactory, particularly because it exposed the hands to accident. Furthermore, it was not uncommon for the points to puncture more than one slip of paper where these were superposed on a pad and give rise to ambiguity of reading, and in that form of the device which printed readings upon a continuous strip duplications were often caused by failure to move the strip after each reading. The present invention avoids these troubles. Instead of the ordinary dial a so-called "cyclometer-dial meter," in which the reading is by a succession of Arabic figures, which show through the face-plate of the meter, is used. In this face-plate are small holes, and I arrange upon a hand-stamp dowels which fit into the holes to determine the position of the stamp. A strip of paper suitably prepared to receive the reading is backed by a moving platen, and arrangements are made by which at each stroke the paper is moved along a distance sufficient to prevent duplication of reading. The number of the meter is also printed at the same time. By this arrangement I obtain an accurate and undeniable reading of the exact condition of the meter, together with the number, so that the record in case of controversy is indisputable.

The accompanying drawings show a device constructed according to this invention.

Figure 1 is a side elevation, partly in section, of a stamp and meter adapted to it. Fig. 2 is a plan of the stamp. Fig. 3 is a front view of the meter-dial, and Fig. 4 shows a modification.

The device is illustrated as applied to an electric meter, in which A is one of the field-coils, and B the armature.

E is the shaft, which drives the wheels of the registering mechanism C. The counter-dials D are geared in the usual way for consecutive registration to one of the wheels of the registering mechanism. The appearance of the dial is best seen in Fig. 3, where the number of the meter, as well as the figures showing its reading, appears.

The construction of the stamp will be best understood from Fig. 2. In this figure, F is the handle, and F' is a rod carrying the recording device or platen G. A spring $f$ insures the return of the platen after each stroke. The paper upon which the record is printed is carried upon the reels $g\,g$. A rack-bar H, provided with a spring H', coöperates with a pinion $h$, the latter having a pawl $h'$ to turn the reels $g\,g$, so as to present a new paper surface at every impression. A printing-ribbon I I extends across the open face of the stamp, and dowels K K are provided which fit into the holes $k\,k$ in the face-plate of the meter.

The operation of the stamp is as follows: When the dowels are placed in position in the holes, the stamp is depressed until the pinion runs off the end of the rack H, the paper is shifted, and immediately after the ribbon I, being pressed against the raised figures upon the dials D and the number of the meter, prints upon the paper a complete record of the meter-face. The spring $f$ then returns the handle to its illustrated position, the pinion $h$ being held by the pawl $h'$ sliding over the rack, which moves away from it through the resilience of the spring H'. The apparatus is then ready for making another record.

The device as so far described is open to one objection—that is, that the figures are reversed as printed upon the recording-strip. This may be overcome by making the meter-dials type-faced; but this is not desirable for many reasons readily apparent. In order to obviate the difficulty, which would in practice be slight, I may employ the modified form of the invention shown in Fig. 4, in which the ink-ribbon is disposed on the inner reels $g$ $g$, while the paper is wound upon the reels I I. Here the shifting device is modified by disposing friction-gears L L' on the side of the outer case and a rack $H^2$ upon the inner carriage, thus shifting the paper in the desired manner. In this case the ink-ribbon would be manually shifted by the milled head J, or an inked pad of well-known type may be used. The paper passes over the reel L', around the friction-gear L, and back to reel L', around which it wound, its course being indicated by the arrows. To compensate for the varying diameters of the roll upon the reel L', the latter is mounted upon a spring-bearing $l$, and the rack $H^2$ is carried upon spring-actuated plungers $h^2$ $h^2$, so that it may readily pass when moving back the ratchet-wheel which drives the gear L. The gear is held against backward rotation by the usual pawl. As the meter-figures are reproduced on the inner side of the paper strip, they are not type-faced, as with the construction shown in the other figures of the drawings.

What I claim as new, and desire to secure by Letters Patent of the United States, is—

1. A device for taking readings of meter-dials, comprising a frame carrying a strip of paper, means for guiding the frame and bringing the paper against the dial readings, an inking-ribbon, and a movable platen for striking the ribbon and paper against the dial readings.

2. A device for taking readings of meter-dials, comprising a stamping-frame, a paper strip to receive a series of impressions, carried by the frame, means for feeding the paper after each impression, and means for guiding the same into alinement with the meter-dial.

3. The combination with the cyclometer-dials of a meter, of a hand-stamp carrying a strip of paper, an inking device, and means operated by the action of the stamp for shifting the strip after each impression.

4. The combination with the cyclometer-dial face of a meter, of a hand-stamp, means for causing the stamp to register with the plate, a strip of paper, an inking device, and gearing operated by the action of the stamp such that in the interval between consecutive impressions the strip is moved sufficiently to prevent duplication or ambiguity of reading.

5. A hand-stamp for taking meter readings, comprising a carriage, reels carrying a strip of paper, a movable platen operated by pressure upon the handle of the stamp, and gearing between the handle and the strip such that after each operation the strip is moved sufficiently to prevent duplication of readings.

6. The combination with the cyclometer-dials of a meter, of a hand-stamp, means for causing it to register with the dial-plate, a strip of paper carried by the stamp and so disposed as to come in contact with the meter readings when the device is applied to the meter, an inking-ribbon and a movable stamping-platen to strike the paper and ribbon and take an imprint of the meter readings.

In witness whereof I have hereunto set my hand this 6th day of February, 1899.

CARYL D. HASKINS.

Witnesses:
B. B. HULL,
EDWARD WILLIAMS, Jr.